3,265,769
BIAXIALLY ORIENTED POLYPROPYLENE FILM CONTAINING BUTYL RUBBER
Albert N. Schaffhausen, St. Paul, Minn., assignor to Minnesota Mining and Manufacturing Company, St. Paul, Minn., a corporation of Delaware
No Drawing. Filed Oct. 9, 1961, Ser. No. 143,603
4 Claims. (Cl. 260—889)

This invention relates to polymer compositions essentially containing isotactic polypropylene and butyl rubber, which compositions in film form are capable of biaxial orientation to a uniform thickness with a minimum of waste material. This invention also relates to uniform caliper biaxially oriented films formed from such compositions and to a process for preparing the films. Further, this invention relates to biaxially oriented films which are coated on at least one surface, e.g., with a normally tacky and pressure-sensitive adhesive.

Films which are to be used for electrical insulation must necessarily be strong enough to withstand the machinery and wrapping operations necessary to apply those films to the electrical conductors which are to be insulated. The film, particularly when employed as the backing for normally tacky and pressure-sensitive adhesive tape, should have a high enough tensile strength to be effective in thicknesses on the order of 1 mil, the finished dimensions of the insulated conductor often being required to fail below specific limits. Film used for such tape should be biaxially oriented, not only to enhance its tensile strength, but also to detect and eliminate pinholes which might otherwise be responsible for electrical failure. It is desirable to have an ultimate elongation of 50% or more both because of the severe forces suddenly imparted by automatic winding equipment and because insulated electrical devices may be subjected to severe flexing. Since insulated wire, cable, or the like is often dipped in hot asphalt, heat resistance of the tape is desirably as high as possible. Comparatively thin films, however, are much less subject to low temperature flex cracking than castings or comparatively thick coatings formed from the same materials.

Isotactic polypropylene, a polymer made by the "low pressure" polymerization of propylene in the presence of a catalyst which is either a supported transition metal oxide or a transition metal halide with an organo-metallic compound of a metal from Groups I–III of the periodic table, displays outstanding electrical characteristics. For example, in thin films its dielectric strength is approximately 6,500 volts per mil (ASTM test D1000–59T) and its power factor is on the order of 0.02% (ASTM test D150–54T). It is extremely inert, resisting attack by a wide variety of solvents with which it may come in contact. In comparison with linear polyethylene (of which it is the simplest isotactic homologue), isotactic polypropylene has lower density, higher melting point, greater tensile strength, and somewhat superior electrical properties.

It is well known that films of linear polyethylene and such stereo-regulated homologues as isotactic polypropylene can be molecularly oriented with a resultant increase in tensile strength and improvement in other physical properties. Prior to my invention, however, biaxial orientation has been extremely difficult to carry out. To illustrate, the tensile strength of an extruded but otherwise unoriented isotactic polypropylene film is about 6,000 p.s.i., the tensile strength of compression molded film being somewhat lower. Although such films can be oriented to a tensile strength of perhaps 40,000 p.s.i. in one direction, any bi-directional orientation process is limited to the production of a low caliper film with a high percentage of wasted material because of the occurrence of "line orientation." In "line orientation" the film does not reduce evenly in caliper but is pulled down to its ultimate oriented thickness (on the order of one-half mil or less) along the edge of a thick section of substantially unoriented material. When this phenomenon occurs, it is difficult to obtain a useful quantity of uniform caliper film of any thickness, and it becomes almost impossible, practically, to prepare a biaxially oriented film having a thickness as great as e.g., one mil. Stretching the film first in one direction and then, in a second step, in a perpendicular direction results in film with non-uniform properties. Similar results are observed when film expanded as a tube is drawn in a longitudinal direction. Other processes have been described for simultaneously stretching sections of film in two mutually perpendicular directions, but either only a small amount of stretch can be achieved or the final product is a low caliper film, e.g., one-half mil.

Belgian Patent No. 572,425 suggests orienting isotactic propropylene film by heating it above its melting point, cooling to a narrow temperature range slightly below the melting point, stretching, and thereafter cooling while maintaining the film under tension. Although this process can be made to work on a laboratory scale, the rapidity with which isotactic polypropylene crystallizes below its melting point makes control very difficult and hence the above described problems of stretching crystalline material are again encountered. I am aware of no technique prior to my invention which renders the production of uniform caliper biaxially oriented poly-alpha-olefin films, especially isotactic polypropylene films having a thickness on the order of one mil, commercially feasible.

I have now devised a means whereby isotactic polypropylene is rendered biaxially orientable while still maintaining its desirable electrical properties. Biaxially oriented films can be made having a uniform predetermined thickness as great as, e.g., one mil with a minimum amount of waste and without the occurrence of significant line orientation. Films made according to my invention are also extremely useful for industrial strapping operations. Other uses for products embodying my invention will readily suggest themselves upon the further reading of this description.

In accordance with my invention crystalline isotactic polypropylene is modified by blending with it minor quantities of butyl rubber, neither the molecular weight nor the degree of unsaturation of the rubber being especially critical. Butyl rubber is produced by the polymerization of isobutylene and a small amount of isoprene at $-125°$ to $150°$ F. in the presence of a Friedel-Crafts catalyst. Butyl rubber itself has electrical properties which are good, although inferior to those of isotactic polypropylene. As will be made apparent, the exact amount of butyl rubber employed in the polymer blends employed in my invention can vary over quite a wide range, but does not exceed 50%. The presence of as little as 1% butyl rubber noticeably enhances the stretching properties of isotactic polypropylene, and a preferred polymer blend contains from 98–90 parts of isotactic polypropylene and correspondingly from 2–10 parts of butyl rubber. Uniformly thick biaxially oriented films can be made from such blends with a minimum of waste. These films are extremely strong, possess a high degree of elongation at break, are unusually clear, and yet retain the desirable electrical characteristics possessed by the unmodified isotactic polypropylene. The presence of even such minor amounts of butyl rubber tends to make the film more readily printable, more adhesive receptive, and may even improve the corona resistance of the unmodified material.

The following examples, in which all parts are by

Example I

Nine parts of "Pro-fax" No. 6511 polypropylene molding powder (an isotactic material having a density of 0.90 gram per cubic centimeter, a melting point of 340° F., and a crystallinity of about 65%, sold by the Hercules Powder Company), were blended with one part of butyl rubber having a molecular weight of 325,000, a mol percent unsaturation of 2.1–2.5, and a Mooney viscosity of about 45 ("Enjay Butyl 365") on a two-roll rubber mill at 360–380° F., approximately 0.167 part of 4,4'-thiobis-(3-methyl-6 tertiary butyl phenol) antioxidant ("Santonox") and 0.333 part of calcium stearate being added as processing aids. Blending was continued until a smooth band was formed from the components, after which the composition was compression molded to form a sheet having a thickness of 28 mils, a tensile strength of approximately 4,000 p.s.i. and an ultimate elongation of more than 800%.

A 2" x 2" sample was cut from the sheet described in the preceding paragraph and gripped at all four sides by a small film stretching device. The entire assembly was placed in a circulating air oven and allowed to reach equilibrium at about 300° F. Opposite sides of the clamped film were then simultaneously moved apart in two mutually perpendicular directions at a constant rate of 600% per minute until the area of the film was increased on the order of 20-fold, i.e., until the dimensions of the film were approximately 9" x 9". The biaxially stretched film was then rapidly cooled to room temperature while being held under tension, after which the thickness was found to be approximately 1.0–1.1 mils. By way of contrast, a 30 mil sheet of unmodified isotactic polypropylene stretched under identical conditions yields film ranging from 0.8–0.9 mil in thickness at the oriented areas to substantially its original thickness at the many sections which remained unoriented.

The tensile strength of the oriented film of this example was 19,000 p.s.i. at an ultimate elongation of 120% in one direction and 26,000 p.s.i. at an ultimate elongation at 90% in a direction perpendicular thereto. The film was essentially uniform in thickness and had a degree of line orientation which may be classified as 2½ on a scale where 5 represents the severe line orientation achieved with unmodified isotactic polypropylene under identical conditions and 0 represents what may be termed "area orientation," or the complete lack of line orientation. The film was sparkling and clear in appearance, its high degree of transparency making it particularly attractive for use where electrical components which have been color coded are to be wrapped with an insulating film without concealing their identification. Dielectric strength was surprisingly 8,500 volts per mil, over 30% higher than that measured for unmodified isotactic polypropylene film. The high degree of clarity also renders products of this type extremely useful in the preparation of strapping tape where it may be desired to apply the tape around packages which have been printed without concealing the printed matter.

Example II

A 90:10 blend of the same polypropylene polymer described in Example I, and a butyl rubber having a molecular weight of 325,000, a mol percent unsaturation of 0.6–1.0 and a Mooney viscosity of 41–49 ("Enjay Butyl 035") was prepared in the same manner described in Example I. When a 28 mil compression-molded sheet formed from the polymer blend was biaxially oriented at 310° F. with a stretch ratio of 4.45:1 in each direction, the final film attained a thickness of 0.9 mil, having a tensile strength of 19,400 p.s.i. at 144% elongation in one direction and a tensile strength of 16,000 p.s.i. at 180% ultimate elongation in a direction perpendicular to the first direction. Although slightly more line orientation was evident than was the case with Example I, the product was substantially uniform in thickness, entirely usable and had the same high degree of clarity as the product described in Example I. Dielectric strength and power factor were similar to those of the product of Example I.

Example III

A 90:10 blend of the same polypropylene polymer described in Example I and a butyl rubber having a Mooney viscosity of 45 and 3.1% unsaturation ("Polysar 600," sold by Polymer Corporation Unlimited) was prepared and compression molded in the same manner described in Example I. A 2" x 2" x 32 mil sheet stretched in mutually perpendicular directions at a stretch ratio of 4.45:1 attained a final thickness of 1.4 mils, having tensile strengths of 20,300 p.s.i. and 17,100 p.s.i. in mutually perpendicular directions at 152% ultimate elongation in each case. The biaxially oriented film displayed approximately the same freedom from line orientation as the product of Example II. Like the products of each of the preceding examples, the film was unusually clear and free from haze and possessed similar electrical properties.

Example IV

A 99:1 blend was prepared from the same isotactic polypropylene and butyl rubber materials described in Example I. A 2" x 2" x 32 mil film was biaxially oriented in mutually perpendicular directions at a stretch ratio of 4.45:1 to yield a film having a thickness of 0.6–0.65 mil. The tensile strengths were 21,400 p.s.i. and 23,600 p.s.i. in mutually perpendicular directions at respective elongations of 98% and 114%. Although this film was quite uniform in thickness and was essentially as transparent as unmodified isotactic polypropylene, it possessed a degree of line orientation too severe for most commercial applications. The thick unoriented sections which typify unmodified isotactic polypropylene were tapered out and, although detectable visually, the "lines" tended to blend together. The resulting film had considerable waste and could not be uniformly biaxially oriented to a thickness as great as one mil. I find it thoroughly astonishing, however, that such a small amount of butyl rubber can produce so profound an effect as that displayed by the product of this example. The aforementioned broad tapered sections can be reduced still further if as little as 2% butyl rubber is employed in the polymer blend.

Where I wish to retain the characteristics of the isotactic polypropylene to as large an extent as possible, as, for example, where I want as strong a film as possible or where I do not wish to incur the problems which may result from the tendency of butyl rubber to swell in the presence of hydrocarbon solvents, I prefer to employ a minimum amount of butyl rubber. Thus I find that polymer blends which contain on the order of 2–10% butyl rubber are especially preferred in the practice of my invention. Where strength, solvent resistance or heat resistance is less critical, however, films containing 10% or more butyl rubber are somewhat easier to orient controllably with a minimum of waste than are films containing lesser amounts of butyl rubber. Films containing larger amounts of butyl rubber, e.g., up to 50%, also possess a high degree of elongation at comparatively lower tensile forces.

Generally speaking, although the uniformity of thickness of biaxially oriented films formed from polypropylene:butyl rubber blends is directly related to the amount of butyl rubber present, the clarity and tensile strength are inversely related to the amount of butyl rubber present. A decrease in clarity and tensile strength is detectable in blends containing 25% butyl rubber, and films formed from blends of equal parts by weight of butyl rubber and isotactic polypropylene are noticeably hazy, have tensile strengths substantially equal to that of unoriented isotactic polypropylene, and exhibit greatly reduced softening temperatures. Thus there are few reasons to prepare a blend containing as much as 50% butyl rubber, even though "line orientation" is totally avoided with such compositions. The example listed below illustrates the preparation of a film from a 2:1 isotactic polypropylene:butyl rubber blend.

Example V

A 2:1 blend was prepared from the same isotactic polypropylene and butyl rubber polymers described in Example I. A 2" x 2" x 32 mil film was biaxially oriented in mutually perpendicular directions at a stretch ratio of 4.45:1 to yield a hazy film having a uniform thickness of about 1.1 mils. Tensile strengths in mutually perpendicular directions were 11,800 and 15,000 p.s.i. at respective ultimate elongations of 80% and 72%. The film is more readily elongated at low stress values than the products of the preceding examples and softens at significantly lower temperatures.

Example VI

The biaxially oriented film prepared in Example I was coated directly with a 95:5 copolymer of isooctyl acrylate and acrylic acid in ethyl acetate solvent, as disclosed in Ulrich U.S. Reissue Patent No. 24,906, to provide a transparent pressure-sensitive adhesive tape suitable for electrical and packaging use. Somewhat greater adhesion of the pressure-sensitive adhesive to the backing may be obtained if the film is first subjected to corona discharge at reduced pressure, flame treatment, surface abrasion, or surface oxidation with strong inorganic oxidizing agents, techniques which are well known in the art in connection with polyethylene and other films.

Because of the comparatively high ultimate elongation in both the machine and transverse directions, tape products of the type disclosed herein have comparatively high tear strength and are generally more suited for use where they are severed by a knife or other cutting means, the jagged edge of a desk dispenser serving as a much less effective means to disjoin them.

Numerous variations in composition, processing and application will readily occur to those skilled in the art. Accordingly, I do not intend to be limited other than by the scope of the appended claims.

What I claim is:

1. A method of converting an isotactic polypropylene polymer into a biaxially oriented polymeric film having a uniform thickness and a tensile strength in mutually perpendicular directions exceeding that of unoriented isotactic polypropylene, comprising the steps of intimately blending a major amount of isotactic polypropylene and a minor amount of butyl rubber which is a copolymer of isobutylene and a small amount of isoprene, forming sheet material from the blended polymers, heating said sheet material to a temperature slightly below and never exceeding the melting point of said polypropylene, and biaxially orienting said sheet material.

2. A biaxially oriented film having a uniform thickness on the order of about 1 mil and a tensile strength exceeding that of unoriented isotactic polypropylene, said film being formed from an intimate blend of from 1 to 50 parts of butyl rubber which is a copolymer of isobutylene and a small amount of isoprene and correspondingly from 99 to 50 parts of isotactic polypropylene.

3. Pressure-sensitive adhesive sheet material comprising (a) a biaxially oriented film having a uniform thickness on the order of 1 mil and a tensile strength exceeding that of unoriented isotactic polypropylene, said film being formed from an intimate blend of from 1 to 50 parts of butyl rubber which is a copolymer of isobutylene and a small amount of isoprene, and correspondingly from 99 to 50 parts of isotactic polypropylene and (b) a layer of normally tacky and pressure-sensitive adhesive firmly united to a major face of said film.

4. A biaxially oriented film having a uniform thickness of at least about 1 mil and a tensile strength exceeding that of unoriented isotactic polypropylene, said film being formed from an intimate blend of from 2 to 10 parts of butyl rubber which is a copolymer of isobutylene and a small amount of isoprene, and correspondingly from 98 to 90 parts of isotactic polypropylene.

References Cited by the Examiner

UNITED STATES PATENTS

| Re. 24,906 | 12/1960 | Ulrich | 260—805 |
| 2,939,860 | 6/1960 | Schramm | 260—889 |

FOREIGN PATENTS

| 835,152 | 5/1960 | Great Britain. |
| 572,425 | 11/1958 | Belgium. |

MURRAY TILLMAN, *Primary Examiner.*

LEON J. BERCOVITZ, *Examiner.*

B. S. LEON, G. F. LESMES, *Assistant Examiners.*